United States Patent [19]
Khuzaie

[11] 3,859,853
[45] Jan. 14, 1975

[54] PRESSURE TAP CONNECTION

[75] Inventor: Kamel A. Khuzaie, San Jose, Calif.

[73] Assignee: General Electric Company, San Jose, Calif.

[22] Filed: June 15, 1973

[21] Appl. No.: 370,427

Related U.S. Application Data

[63] Continuation of Ser. No. 199,430, Nov. 17, 1971, abandoned.

[52] U.S. Cl. .................................. 73/213, 138/44
[51] Int. Cl. ......................... F15d 1/02, G01f 1/00
[58] Field of Search ............ 73/213; 60/108; 138/44

[56] References Cited
UNITED STATES PATENTS

| | | | |
|---|---|---|---|
| 2,284,013 | 5/1942 | Pardoe | 73/213 |
| 2,560,634 | 7/1951 | Colley | 73/213 |
| 2,995,933 | 8/1961 | Patton | 73/213 |
| 3,251,226 | 5/1966 | Cushing | 73/213 |
| 3,326,041 | 6/1967 | Reed | 73/213 |

FOREIGN PATENTS OR APPLICATIONS

| | | | |
|---|---|---|---|
| 454,409 | 12/1924 | Germany | 73/213 |

*Primary Examiner*—Herbert Goldstein
*Attorney, Agent, or Firm*—Ivor J. James, Jr.; Samuel E. Turner; Sam E. Laub

[57] ABSTRACT

In a fluid flow rate measuring arrangement for use in relatively large pipes, the pressure tap at the throat of a venturi is connected to a circumferentially offset pressure take-off fitting in the wall of the pipe by means of a relatively long curved pressure tube located in the space between the venturi and the pipe wall.

1 Claim, 3 Drawing Figures

INVENTOR.
KAMEL A. KHUZAIE

PRESSURE TAP CONNECTION

This is a continuation, of application Ser. No. 199,430, filed Nov. 17 1971 now abandoned.

BACKGROUND

There are many instances where it is necessary to measure the flow rate of fluids. In a steam power plant, for example, water is circulated through a heat exchanger situated in a pressure vessel. Steam thus produced is taken from the pressure vessel through steam lines and applied to a steam turbine. Exhaust steam from the turbine is condensed and returned to the pressure vessel as feed water. It is, of course, desirable to measure the flow rate of steam through the main steam lines to the turbine. It is additionally desirable to place a restriction in the steam lines to limit the escape of steam and water from the pressure vessel during the period of time required for shutoff valves to close in the unlikely event that the steam lines become open. It is a mechanical and economic advantage if flow measurement and flow restriction purposes can be served by the same device.

A well-known device, well adapted to serve both purposes, is a venturi. A venturi is a fluid flow constriction usually consisting of a pair of truncated cone-like sections connected at their small ends to form a throat section. The velocity of a fluid flowing through the venturi increases to a maximum through the throat section with the result that the fluid pressure decreases in the throat section. With such a venturi placed in a line, the fluid flow rate therethrough can be measured by a calibrated differential pressure meter connected to a pressure tap in the throat section of the venturi and to a line pressure tap preferably placed in the fluid line upstream of the venturi.

A venturi of relatively small size can be constructed with solid walls, either with a uniform outside diameter or a tapered outside diameter. In either case, the pressure tap at the throat section is readily accessible for attachment of a pressure tube. However, when a venturi is to be used in lines of large size, for example, steam lines of power plants in the order of 2 feet in diameter, several problems arise. To maintain the integrity of such high pressure lines and for construction convenience, a venturi for use in large pipes is formed as a separate element and placed inside of the pipe. Usually this venturi element is formed with substantially uniform side walls thus leaving an annular space between the venturi and the pipe wall when the venturi is inserted in the pipe. Thus a pressure tube attached to a tap at the venturi throat must traverse this annular space and be connected through the pipe wall. Such a venturi is quite long, in the order of 5 feet. This creates a problem of differential thermal expansion as the plant is, for example, brought on-line from the shut-down or stand-by condition. For this reason the venturi is attached to the pipe only at one transverse plane, for example, at either end or at the throat. In any case, the pressure tube connection must accommodate thermal and vibration induced movements between the venturi pressure tap and the connection through the pipe wall.

In a known prior arrangement the venturi is fixed inside the pipe by an annular support ring welded between the inside of the pipe and the outside of the venturi at the throat section of the venturi. A radial passage through this support ring provides a pressure tap connection. This arrangement is undesirably expensive and complicated.

In another known arrangement, one end of the venturi is welded to the inside of the pipe; a pressure tube is connected to a pressure tap at the venturi throat and the pressure tube is passed through a clearance hole in the wall of the pipe. A standpipe or cupola is fitted around the clearance hole in the pipe and the pressure tube is run through this cupola. The cupola is made sufficiently long to provide for flexing of the pressure tube within the cupola as thermal and vibration induced movement between the venturi and the pipe takes place. This arrangement requires an undue amount of space to accommodate the radially extending cupola. This is particularly true where more than one pressure connection must be made to the venturi to provide redundant flow measuring systems.

SUMMARY

An object of the invention is to provide an improved fluid flow measurement arrangement which avoids the above-discussed difficulties of prior arrangements.

Another object is to provide a flexible connection to the pressure tap in a venturi within a fluid conducting pipe.

These and other objects are achieved by an arcuate-shaped pressure tube connected at one end to a pressure tap in the throat of the venturi and at its other end to a fitting in the wall of the fluid conducting pipe whereby the pressure tube extends circumferentially in the space between the venturi and the pipe a sufficient distance to provide the requisite flexibility without danger of fatiguing the pressure tube.

DRAWING

The invention is described more specifically hereinafter with reference to the accompanying drawing wherein.

DESCRIPTION

Figure 1:
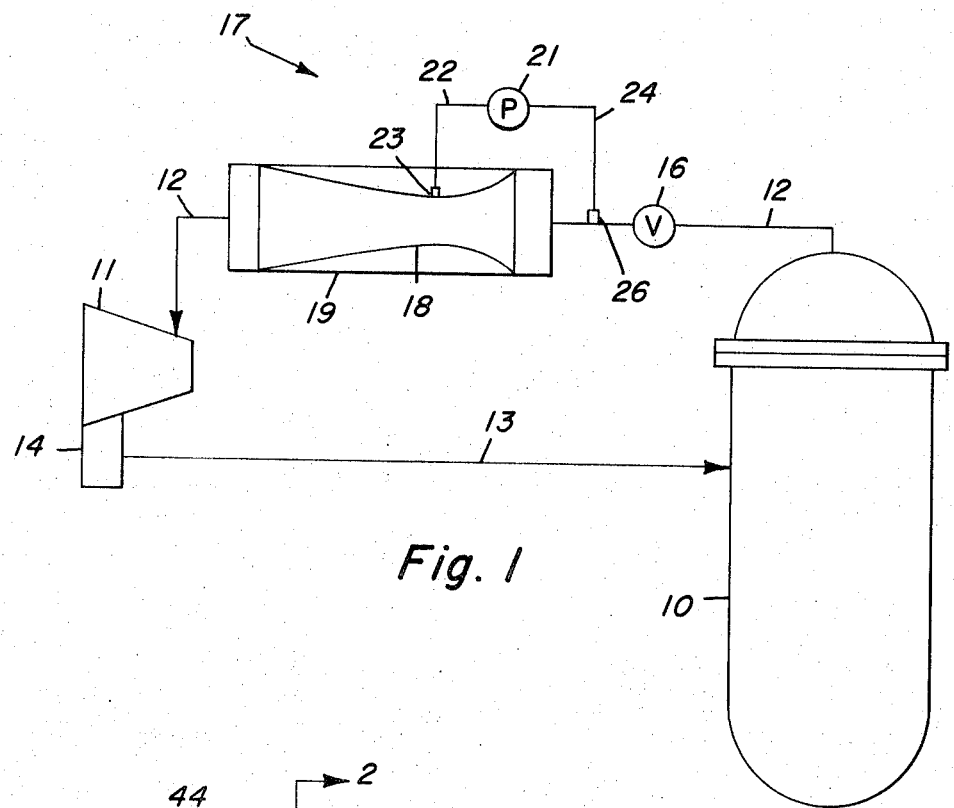
FIG. 1 is a schematic illustration of a steam power plant.

As an example use of the present invention a steam power plant is illustrated in simplified schematic form in FIG. 1. Steam is produced by well-known means in a pressure vessel 10 and is fed to a load, such as a turbine 11, through a main steam line 12. Condensate is returned to the pressure vessel through a feedline 13 from a condenser 14.

Included in the steam line 12 is a shut-off valve 16, also included in the steam line 12 is a steam flow rate measuring arrangement 17. The arrangement 17 includes a venturi 18 within a section 19 of the steam line 12, a differential pressure meter 21, a first pressure tube 22 connected between the meter 21 and a pressure tap 23 at the throat of the venturi 18, and a second pressure tube 24 connected between the meter 21 and a pressure tap 26 in the steam line 12 upstream from the venturi 18. As steam flows through the constricting throat of the venturi 18, its velocity increases and the pressure at pressure tap 23 decreases relative to the steam line pressure at pressure tap 26. As is well-known this pressure difference is a function of rate of steam flow through the steam line 12. The meter 21 registers this pressure difference and can be calibrated in well-known manner to read the steam flow rate.

Figure 3:
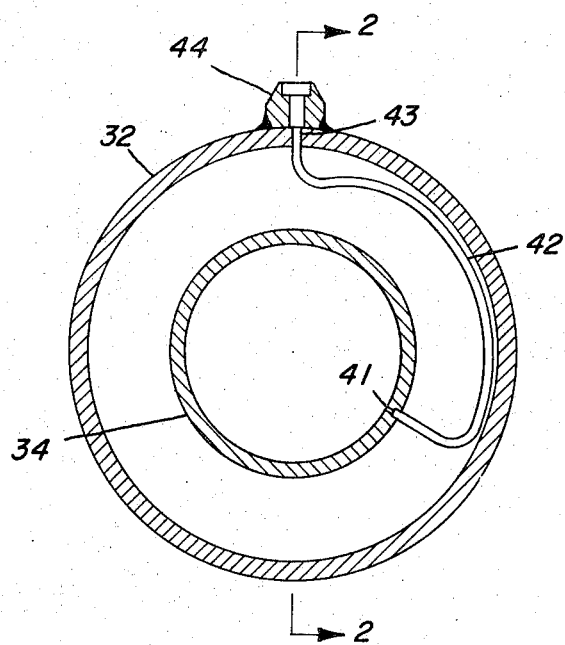
FIG. 3 is a transverse cross section view of the embodiment of FIG. 2.
Figure 2:
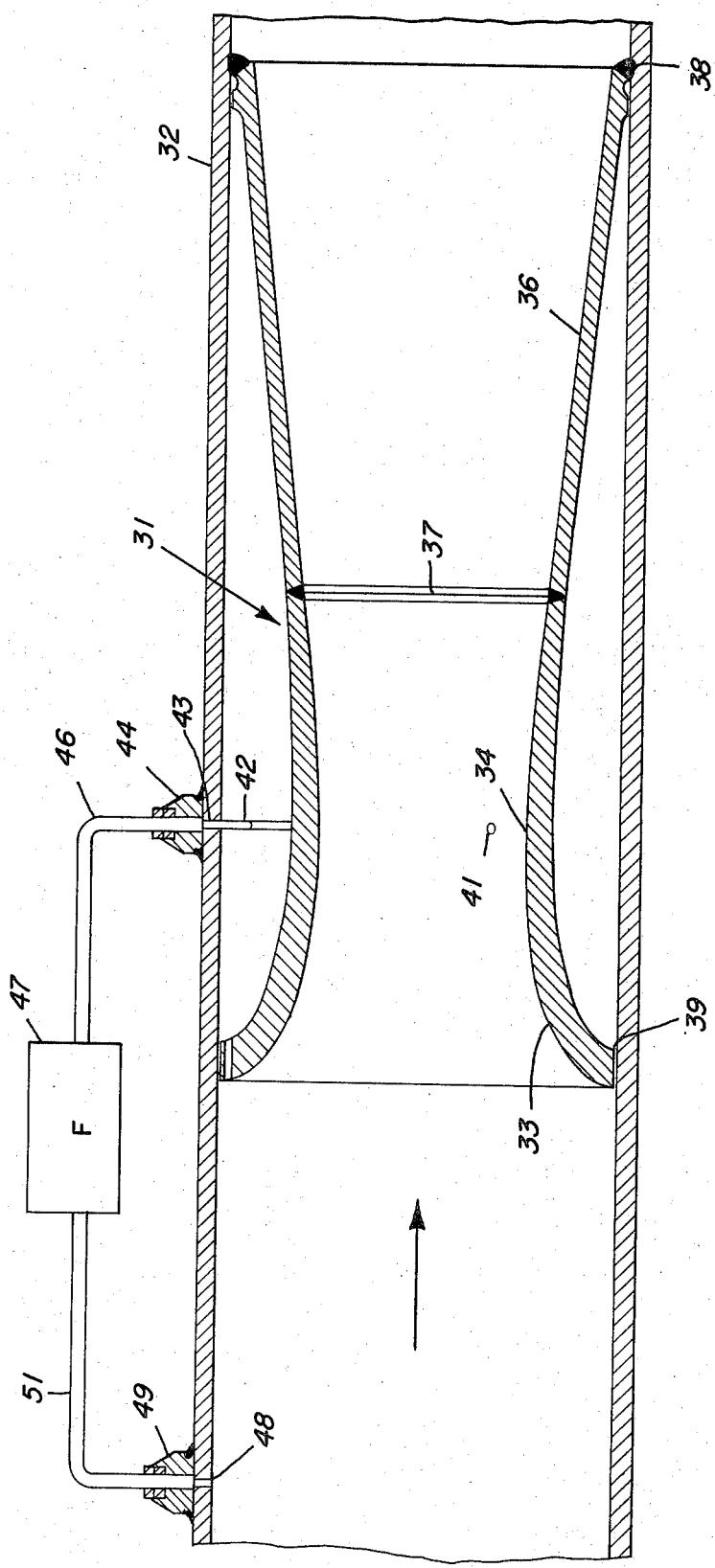
FIG. 2 is a longitudinal cross section view of an embodiment of the invention.

Details of the venturi arrangement of the invention are shown in FIGS. 2 and 3. A venturi 31 positioned within a fluid conducting pipe 32 comprises a converging inlet section 33, a throat section 34 and a diverging diffuser section 36, the fluid flow being from left to right as indicated by the arrow in FIG. 2. (The diffuser section 36 is formed as a separate piece and is welded to the throat section at a weld 37 during installation of the venturi in the pipe as explained more fully hereinafter.) The venturi 31 is secured within the pipe 32 at its outlet end by a single weld 38 and is formed with a clearance 39 of a few hundreths of an inch at its input end. Thus no support rings or flanges or difficult welds are required.

To detect the pressure at the throat section 34 of the venturi 31 a low pressure tap 41, in the form of a radially directed hole through the throat section, is provided. The outer portion of this hole is countersunk to receive one end of a first pressure tube 42 for welding thereto. The other end of pressure tube 42 is welded in an aperture 43 in the wall of pipe 32, the aperture 43 being in communication with a first pressure fitting 44 fixed to the outside of pipe 32. In accordance with the invention, the aperture 43 in the wall of pipe 32 is circumferentially offset from the low pressure tap 41 and the pressure tube 42 is bent so that it is positioned circumferentially in the space between the throat section 34 and the pipe 32. This greatly increases the length of the pressure tube 42 to increase its flexibility and lower the stresses therein. As illustrated in FIG. 3, the aperture 43 is offset about 120° from the pressure tap 41. However, the amount of offset is not limited and can be selected to provide the required degree of flexibility under the particular circumstances. For example, the pressure tube 42 can circle the venturi throat one or more times if a greater amount of flexibility and even lower bending stresses in tube 42 are desired. Also, a lesser amount of offset could be used; however, about 30° is the practical minimum required to accommodate the bends in the tube 42 since these bends should be no sharper than about one and one-half times the tube radius.

The flow measuring arrangement of FIGS. 2 and 3 further includes a second pressure tube 46 connected between the first pressure fitting 44 and a pressure differential utilization device 47 (such as a meter), a high pressure tap 48 located upstream from venturi 31, a second pressure fitting 49 fixed to pipe 32 and communicating with tap 48, and a third pressure tube 51 connected between fitting 49 and the device 47.

In an embodiment of the invention for use in a stream line of a power plant the pipe 32 has an inside diameter of 24 inches, the venturi 31 has an overall (assembled) length of 60 inches and a throat diameter of 12 inches, and the high pressure tap 48 is located 24 inches upstream from the inlet end of the venturi 31. All parts are formed of metal, such as steel, suitable for use in the high-pressure, high-temperature environment of the steam supply system, the pressure tube 42 preferably being formed of stainless steel.

The venturi 31 may be assembled and installed in the pipe 32 as follows: the pressure tube 42, of required shape and length for the degree of offset, is welded in the countersunk portion of pressure tap 41 in throat section 34. The integral inlet section 33 and throat section 34 of venturi 31 are inserted into the open end of pipe 32 (the right hand end as shown in FIG. 2) and longitudinally and radially aligned. The outer end of pressure tube 42 is welded into the aperture 43. The diffuser section 36 is then inserted and the weld 37 is formed. Finally, the venturi is fixed in the pipe 32 by forming the weld 38.

Thus, what has been described is a fluid flow rate measuring arrangement which is tolerant of vibration and thermally induced movement and which is relatively simple to manufacture and install.

What is claimed is:

1. In a steam supply system including a pressure vessel containing a supply of pressurized steam, a steam utilization device, and a steam pipe for conducting pressurized steam from said pressure vessel to said utilization device, a venturi arrangement for measuring the steam flow rate through said steam pipe comprising: a venturi member in said pipe including a converging inlet section having an outside diameter at its input end to provide an installation clearance relative to the inside diameter of said pipe, a throat section having reduced inside and outside diameters relative to the inside diameter of said pipe whereby a space is provided between said throat section and said pipe, and a diverging diffuser section welded at its inlet end to the outlet end of said throat section and welded at its outlet end to said pipe to secure said venturi member in said pipe; a first pressure tap in the wall of said throat section of said venturi member; a pressure take-off aperture in the wall of said pipe adjacent said throat section; a pressure tube located in said space between said throat section and said pipe, said pressure tube being welded at one end to said throat section in communication with said first pressure tap and welded at its other end to said wall of said pipe in communication with said aperture, at least a portion of said pressure tube being positioned substantially circumferentially within said space and at least partly encircling said throat section of said venturi member; a second pressure tap located in the wall of said pipe and spaced along said pipe from said venturi member; and means communicating with said aperture and with said second pressure tap for sensing the difference in pressures at said first and second pressure taps.

* * * * *